W. WHITE.
COTTON DISTRIBUTER.
APPLICATION FILED FEB. 15, 1916.
1,241,318.
Patented Sept. 25, 1917.
3 SHEETS—SHEET 1.
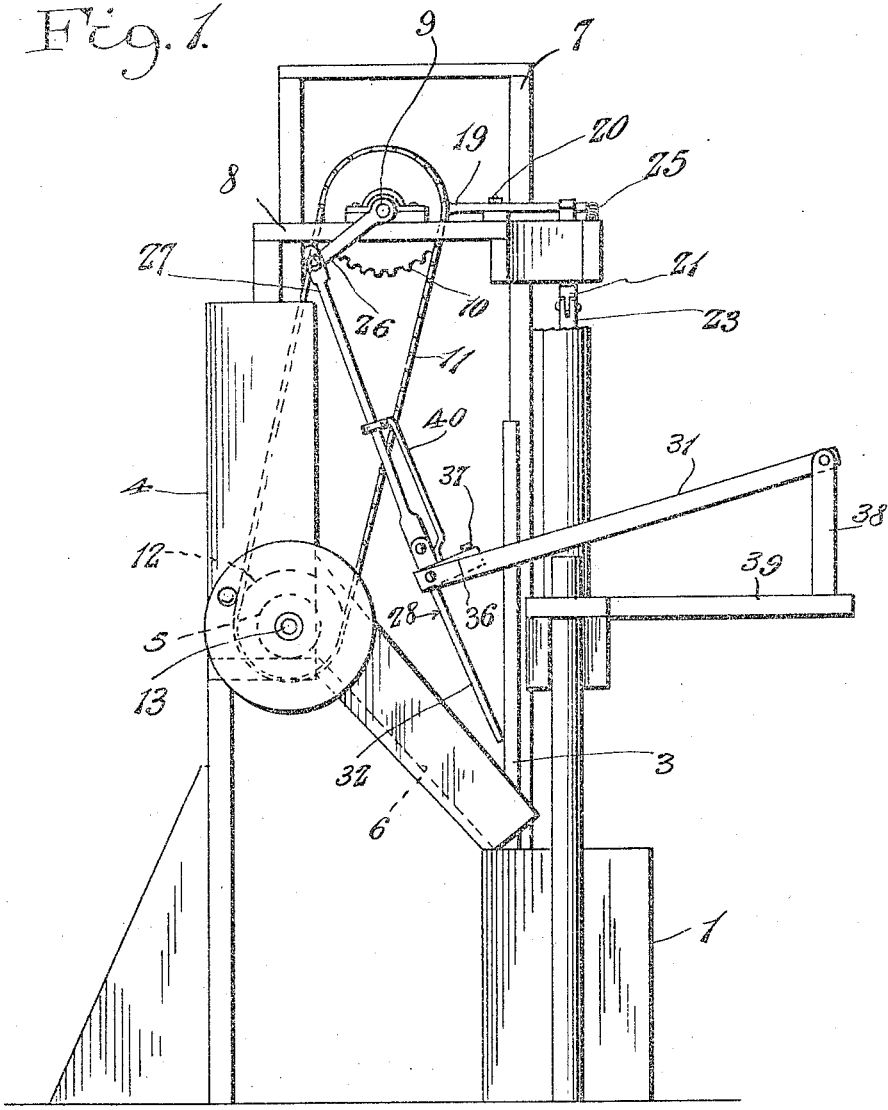
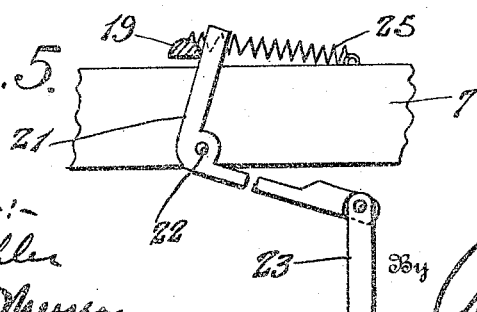

W. WHITE.
COTTON DISTRIBUTER.
APPLICATION FILED FEB. 15, 1916.
1,241,318.
Patented Sept. 25, 1917.
3 SHEETS—SHEET 2.
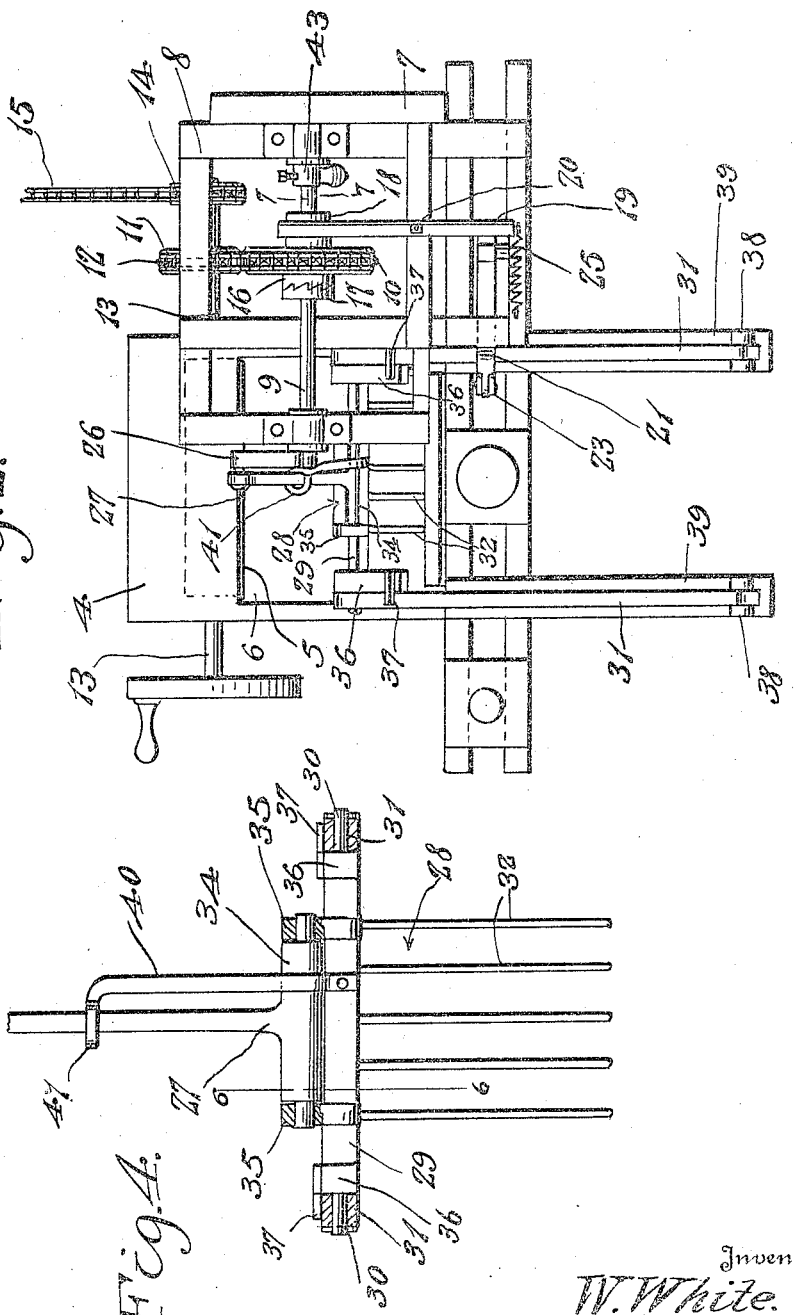

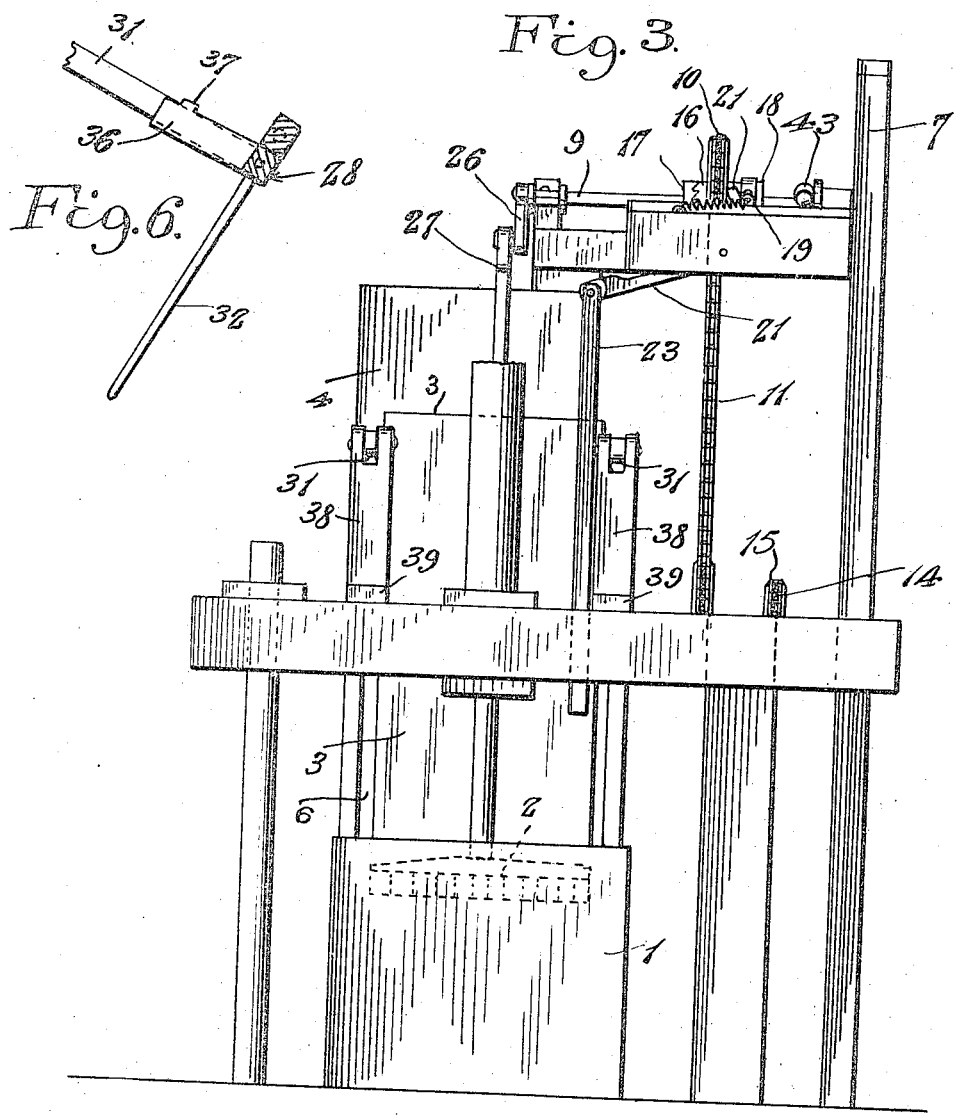

UNITED STATES PATENT OFFICE.

WILLIAM WHITE, OF GRANITE, OKLAHOMA.

COTTON-DISTRIBUTER.

1,241,318.      Specification of Letters Patent.      Patented Sept. 25, 1917.

Application filed February 15, 1916. Serial No. 78,454.

*To all whom it may concern:*

Be it known that I, WILLIAM WHITE, a citizen of the United States, residing at Granite, in the county of Greer and State of Oklahoma, have invented certain new and useful Improvements in Cotton-Distributers; and I do hereby declare the following to be a full, clear, and exact description of the invention, such as will enable others skilled in the art to which it appertains to make and use the same.

This invention relates to a device adapted for attachment to cotton pressers, and the primary object of the invention is to provide a mechanically operated device for equally distributing the cotton within the press chamber, prior to the compression of the same by the pressing head.

Another object of this invention is to provide means for automatically controlling the operation of the cotton distributing means, which means is operable by the compressing head of the baling press.

A further object of this invention is to provide a cotton distributer as specified which includes a fork or rake which is operatively connected to a crank shaft and is supported by a suitable pivotally mounted supporting structure, for movement over the board which guides the cotton lint from a condenser to the baling chamber to provide means whereby the crank shaft is rotated by the rotation of the beating roll for operating the distributing fork and also to provide means for stopping the fork in a predetermined position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved distributer showing the same attached to an ordinary power cotton press.

Fig. 2 is a top plan view of the distributer applied to the press.

Fig. 3 is a front view of the distributer.

Fig. 4 is a detail view of the cotton distributing fork.

Fig. 5 is a fragmentary view of the mechanism for controlling the operation of the fork.

Fig. 6 is a section on the line 6—6 of Fig. 4.

Fig. 7 is a section on the line 7—7 of Fig. 2.

Referring more particularly to the drawings, 1 designates the baling chamber of a cotton baling press, in which the cotton is compressed by a pressing head 2. The pressing head 2 is operated, in any suitable manner as ordinary and it has an upstanding board 3 attached thereto which prevents cotton from passing into the chamber 1 during the downward movement of the compressing head. The numeral 4 designates an ordinary condenser into which the cotton passes from an ordinary cotton gin, 5 designates the roller which feeds the cotton from the condenser over the guiding board 6 to the baling chamber 1. The condenser 4, and the supporting structure 7 of the cotton press has an auxiliary supporting structure 8 mounted thereon which rotatably supports a shaft 9. The shaft 9 has a sprocket 10 loosely mounted thereon about which a sprocket chain 11 travels. The sprocket chain 11 also travels about a sprocket 12 which is mounted upon the shaft 13, which carries the roller 5. The shaft 13 is connected by means of a sprocket 14 and sprocket chain 15 to any suitable type of power source necessary for rotating the shaft, and the roller 5. The sprocket 10, has a clutch segment 16 formed upon one side of the hub section thereof which is adapted for meshing engagement with a clutch segment 17. The clutch segment 17 is keyed upon the shaft 9 for synchronous rotation therewith. The sprocket 10 has a collar 18 formed upon its hub section upon the opposite side of the sprocket from the clutch segment 16. The collar 18 has a lever 19 connected thereto which lever is pivotally supported as is shown at 20. The lever 19 extends across the auxiliary supporting frame 8 and has its free end positioned in the path of the upper end of a bell crank 21. The bell crank 21 is pivotally supported as is shown at 22, by the auxiliary frame 7 and it extends transversely to the direction of extension of the lever 19 so that when the bell crank is rocked, the lever 19 will be moved upon its pivotal support 20 for moving the clutch segment 16 into or out of operative engagement with the clutch segment 17. The end of the bell crank 21 which is remote from the end that is positioned for engagement with the lever 19 is pivotally connected to a vertical bar 23 which bar extends downwardly and has its lower end positioned so that it will be engaged by the compression head 2, when the compressing head reaches the limit of its upward movement. When the compressing head 2 engages the lower end of the bar 23, it will move the bar 23 vertically and rock the bell crank 21, which will in turn move the lever 19 upon its pivotal support and move the clutch section 16 into engagement with the clutch section 17 for rotating the shaft 9 by the rotation of the shaft 13. The weight of the lever or bar 23 will after the compressor head 2 has moved downwardly out of engagement with the lower end of the bar rock the bell crank 21 and move it out of engagement of the lever 19 at which time the lever will be moved upon its pivotal support by a coil spring 25, which will move the clutch segment 16 out of engagement with the clutch segment 17, during the downward movement of the presser head.

The shaft 9 has a crank 26 mounted upon one end of the same to the outer end of which is connected the handle 27 of the fork structure 28. The distributing fork structure 8 includes a back bar 29 which is pivotally connected as is shown at 30, to a pair of pivotally supported arms 31. The back bar 29 has a plurality of cotton engaging tines 32 formed thereon and extending downwardly therefrom for engaging the cotton and properly distributing it within the chamber 1. The handle 27, of the fork structure 28 has a cross bar or head 34 formed thereupon which is pivotally connected to ears 35 which are carried by the back bar 29. The back bar 29 has lugs 36 carried thereby upon which lugs are formed transversely extending pins 37. The pins 37 engage the upper edges of the pivoted arms 31 for limiting the movement of the fork structure 28 independent of the pivotal movement of the arms 31. The arms 31 are pivotally supported by standards 38, which are carried by a suitable supporting structure 39.

A bar 40, is attached to the back bar 29 and extends upwardly, substantially parallel with the handle 27. The bar 40 has an enlarged slotted head 41 formed upon its upper end, through the slots of which the handle 27 extends. The slotted head 41 provides means for limiting the pivotal movement of the handle independent of the movement of the back bar 29 and the tines 32.

The shaft 9 has a weight 43 mounted thereon which weight is provided for counter-balancing the weight of the fork structure so that the fork structure will stop substantially at an angle of 65 degrees, when the clutch segments 16 and 17 are moved out of engagement with each other by the action of the spring 25. In the operation of the improved distributer for regulating the feeding of the cotton into the chamber 1; when the compressing head 2 starts on its downward path, it will move out of engagement with the lower end of the vertical arm 23 which will permit the spring 25 to act for moving the clutch segment 16 out of engagement with the clutch segment 17, which will stop the operation of the distributing fork structure 28. The vertical board 3, which is carried by the presser head will prevent the cotton from passing over the guiding board 6 into the chamber during the downward compressing movement of the head 2. When the head 2 moves upwardly, it will, as it nears the terminal of its upward movement, engage the lower end of the vertical arm 23 and move this arm upwardly rocking the bell crank 21 and the lever 19 for moving the clutch segment 16 into engagement with the clutch segment 17, which will operatively connect the sprocket 10 to the shaft 9, and consequently operatively connect the shaft 9 to the shaft 13. The rotation of the shaft 9 will rotate the crank 26 and move the fork structure 28 in an upward swinging movement, which movement is steadied by the pivoted arms 31. The crank 26 will impart the proper movement to the fork structure to insure its proper feeding and distribution of the cotton within the chamber 2.

What is claimed is:—

1. In a feeder for cotton presses, a frame structure, a shaft rotatably supported by said frame structure and operatively connected to a power source, a crank arm formed upon said shaft, a cotton distributing fork, handle for said fork, said handle connected to said crank for operating said fork upon rotation of the shaft, a pivotally mounted supporting structure connected to said fork, said fork being connected to said pivotally mounted supporting structure for independent pivotal movement.

2. In a feeder for cotton presses, a frame structure, a shaft rotatably supported by said frame structure and operatively connected to a power source, a crank formed upon said shaft, a cotton distributing fork including a back bar, a plurality of tines carried by said back bar, a handle structure pivotally connected to said back bar, said handle being connected to said crank for operating said fork upon rotation of the shaft, and means for limiting the pivotal movement of said handle independent of said back bar.

3. In a feeder for cotton presses, a frame structure, a shaft rotatably supported by said frame structure and operatively connected to a suitable power source, a crank formed upon said shaft, a cotton distributing fork including a handle, said handle being connected to said crank for operating said fork upon rotation of the shaft, a pivotally mounted supporting structure connected to said fork, said fork being connected to said pivotally mounted supporting structure for independent pivotal movement, and means for limiting the independent pivotal movement of the fork.

4. In a feeder for cotton presses, a frame structure, a shaft rotatably supported by said frame structure and operatively connected to a power source, a crank formed upon said shaft, a cotton distributing fork including a back bar, a plurality of tines carried by said back bar, a handle structure pivotally connected to said back bar, said handle being connected to said crank for operating said fork upon rotation of the shaft, and means for limiting the pivotal movement of said handle independent of said back bar, a pivotally mounted supporting structure pivotally connected to said back bar, and means for limiting the pivotal movement of said fork structure independently of movement of said pivoted supporting structure.

In testimony whereof I affix my signature in presence of two witnesses.

WILLIAM WHITE.

Witnesses:
P. W. RAEMER,
HINES McKEE.

Copies of this patent may be obtained for five cents each, by addressing the "Commissioner of Patents, Washington, D. C."